US008933939B2

(12) United States Patent
Li et al.

(10) Patent No.: US 8,933,939 B2
(45) Date of Patent: Jan. 13, 2015

(54) METHOD AND APPARATUS FOR SEARCH IN VIRTUAL WORLD

(75) Inventors: Qi Cheng Li, Beijing (CN); Song Song, Beijing (CN); Jian Wang, Beijing (CN); Yi Min Wang, Shanghai (CN); Zi Yu Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 13/105,162

(22) Filed: May 11, 2011

(65) Prior Publication Data

US 2012/0081369 A1 Apr. 5, 2012

(30) Foreign Application Priority Data

Sep. 30, 2010 (CN) .......................... 2010 1 0506438

(51) Int. Cl.
*G06T 15/60* (2006.01)
*G06T 15/20* (2011.01)
*G06T 19/00* (2011.01)

(52) U.S. Cl.
CPC ............... *G06T 15/20* (2013.01); *G06T 19/003* (2013.01)
USPC ............................ 345/473; 345/419; 345/426

(58) Field of Classification Search
None
See application file for complete search history.

(56) References Cited

U.S. PATENT DOCUMENTS

| 6,329,986 | B1 * | 12/2001 | Cheng | 345/419 |
| 6,396,509 | B1 * | 5/2002 | Cheng | 715/706 |
| 7,146,576 | B2 * | 12/2006 | Chang et al. | 715/848 |
| 2009/0051681 | A1 * | 2/2009 | Sharp et al. | 345/419 |
| 2009/0094225 | A1 * | 4/2009 | Cradick et al. | 707/5 |
| 2009/0132931 | A1 * | 5/2009 | Tatsubori | 715/752 |
| 2010/0302378 | A1 * | 12/2010 | Marks et al. | 348/169 |
| 2011/0022269 | A1 * | 1/2011 | Nakazono et al. | 701/41 |

FOREIGN PATENT DOCUMENTS

| CN | 1205478 A | 1/1990 | |
| WO | WO0070489 A2 * | 11/2000 | ............. G06F 17/00 |
| WO | WO 2009119577 A1 * | 10/2009 | |

OTHER PUBLICATIONS

Otmane, et al "Towards a Collaborative 3D Interaction Model for Cooperative Design in Virtual Environments", Proc. 11th Intl Conf. on Computer Supported Cooperative Work in Design, 2007.*
Rueda, et al "Managing Objects in P2P DVEs", Proc. Intl. Conf. on Parallel and Distributed Processing Techniques and Applications PDPTA, Las Vegas, NV, Jul. 13-17, 2009.*
Zhang, et al "Multiscale Space and Place", Space, Spatiality and Technology, Kluwer Academic Publishers, P. Turner and E. Davenport (Eds.), vol. 5, pp. 261-280, 2005.*

(Continued)

*Primary Examiner* — Ulka Chauhan
*Assistant Examiner* — Patrick F Valdez
(74) *Attorney, Agent, or Firm* — Douglas A. Lashmit; Hoffman Warnick LLC

(57) ABSTRACT

A method and apparatus for evaluating attention degree in 3D virtual world are provided, the 3D virtual world comprising at least one virtual object and at least one avatar controlled by user, the at least one avatar having corresponding avatar view field. The method comprises: obtaining geometrical information about the avatar view field and geometrical information about the virtual object; determining the association between the avatar view field and the virtual object based on the geometrical information; evaluating attention degree of the virtual object based on the association; and providing evaluation result on attention degree of the virtual object. Corresponding apparatus is also provided. The above method and apparatus have provided attention degree related statistic collection and search feature for the virtual world.

18 Claims, 7 Drawing Sheets

(56) References Cited

OTHER PUBLICATIONS

Bouras, et al. "Exploiting Virtual Objects' Attributes and Avatar's Behavior in DVEs Partitioning", 17th Intl. Conf. on Artificial Reality and Telexistence, 2007.*

IBM, "Method and system to publish immersive advertisements in virtual world", IP.Com, Jul. 7, 2009, IPCOM000184981D, 5 pages.

Leckenby et al., "From the Editors: Why We Need the Journal of Interactive Advertising", Journal of Interactive Advertising, vol. 1, No. 1, Fall 2000, pp. 1-3.

Chinese Patent Office, Office Action for CN Application No. 201010506438.9 dated Dec. 23, 2013, 8 pages.

Dave Snowdon et al., A 3D Collaborative Virtual Environment for Web Browsing, Department of Computer Science, The University of Nottingham, UK, 8 pages, 1997.

Daisuke Takada et al., A Heirarchical Annotation Database and a Dynamic Priority Control Technique of Annotation Information for a Networked Wearable Augmented Reality System, Graduate School of Information Science and Technology, Osaka University, Osaka, Japan, 8 pages, 2008.

Rosta Farzan et al., Social Navigation Support for Information Seeking: If you Build It, Will They Come?, Intelligent Systems Program, University of Pittsburgh, Pittsburgh, Pennsylvania, 12 pages, 2009.

Jauvane C. De Oliveira et al., Velvet: An Adaptive Hybrid Architecture for VEry Large Virtual EnvironmenTs, School of Information Technology and Engineering, University of Ottawa, Ontario, Canada, 5 pages, 2002.

Matted Varvello et al., Distributed Avatar Management for Second Life, Copyright 2009 IEEE, 6 pages.

\* cited by examiner

METHOD AND APPARATUS FOR SEARCH IN VIRTUAL WORLD

TECHNICAL FIELD

The present invention is directed to three-dimensional (3D) virtual worlds, and more particularly, to a method and apparatus for evaluating an attention degree in a 3D virtual world.

RELATED ART

With the rapid development of the Internet, 3D virtual worlds, including games and virtual communities, have been increasingly applied in various scenes to provide a vivid simulation of the real world for users. For such virtual world systems, generally, a user logs in via a certain identifier (ID), and after entering the virtual world, the user performs activities in that virtual world as an avatar therein.

Generally, there are multiple avatars in a virtual world scene which perform different activities respectively. In many cases, the provider or manager of a virtual world and users (avatars) of the virtual world may wish to know information about real time trends in the virtual world, for example, where attractive objects, activities, etc., are located and/or occurring in the virtual world, what is the hot spot currently focused on by most avatars, what is the rank of currently hot things, and so on. This requires the monitoring of the behavior of avatars in the virtual world, and the collection of statistical information about attention degree, so as to provide a hot spot search.

For such statistical collection and search, text and content based statistical collection and search technology in the art, such as Google search, can not be applied in a virtual world. Furthermore, most existing virtual world systems tend to focus on how to provide more fantastic scenes, with little effort on providing the above search and statistic collection feature.

SUMMARY OF THE INVENTION

In view of the problems and objects set forth above, the present invention provides an attention degree related search feature for a 3D virtual world. A method and system are provided that are capable of performing attention degree related statistical collection and search in real time based on avatar behavior in a virtual world.

According to a first aspect of the invention, there is provided a method for evaluating attention degree in a 3D virtual world, the 3D virtual world comprising at least one virtual object and at least one avatar controlled by a user, the at least one avatar having a corresponding avatar view field, the method comprising: obtaining geometrical information about the avatar view field and geometrical information about the at least one virtual object; determining an association between the avatar view field and the at least one virtual object based on the geometrical information; evaluating an attention degree of the at least one virtual object based on the association; and providing an evaluation result for the attention degree of the at least one virtual object.

According to a second aspect of the invention, there is provided an apparatus for evaluating attention degree in a 3D virtual world, the 3D virtual world comprising at least one virtual object and at least one avatar controlled by a user, the at least one avatar having a corresponding avatar view field, the apparatus comprising: a geometrical information obtaining unit configured to obtain geometrical information about the avatar view field and geometrical information about the at least one virtual object; an association determining unit configured to determine an association between the avatar view field and the at least one virtual object based on the geometrical information; an evaluating unit configured to evaluate an attention degree of the at least one virtual object based on the association; and a result providing unit configured to provide an evaluation result for the attention degree of the at least one virtual object.

The search method and apparatus of the present invention can provide attention degree related statistical information and search results, which can be used in various features such as, for example, determining hot ranks, generating recommendations, etc.

BRIEF DESCRIPTION OF THE DRAWINGS

FIG. 2, comprising

DETAILED DESCRIPTION OF THE INVENTION

Next, detailed embodiments of the invention will be described in conjunction with the accompany drawings. In embodiments of the invention, whether a virtual object attracts attention from avatars and from how many avatars, is determined based on a relationship between view fields of avatars and the virtual object in the virtual world, thereby providing an attention related search result. However, it should be appreciated that the description of the following detailed embodiments are provided merely to explain example(s) of the invention, rather than to impose any limitation on the scope of the invention.

Figure 1:
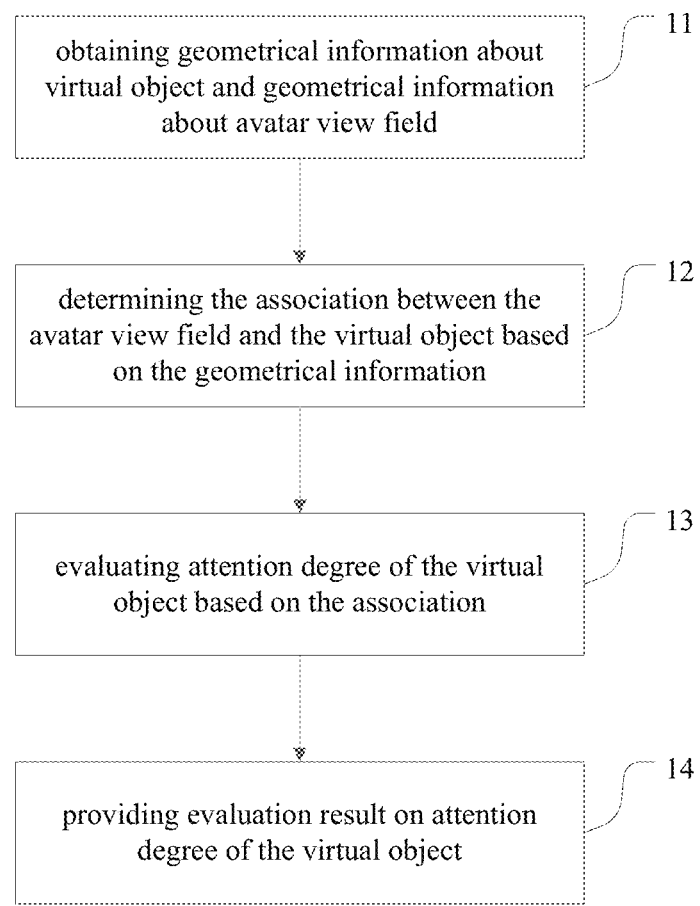
FIG. 1 is a flow chart of a method for performing a search in a virtual world according to an embodiment.

FIG. 1 is a flow chart of a method for performing a search in a 3D virtual world according to an embodiment of the invention. The 3D virtual world comprises a plurality of virtual objects and avatars controlled by users. Each avatar has a corresponding avatar view field. As shown, the method comprises: step 11 in which geometrical information about the virtual objects and geometrical information about the avatar view fields are obtained; step 12 in which an association between the avatar view fields and the virtual objects is determined based on the geometrical information; step 13 in which an attention degree of the virtual objects are evaluated based on the association; and step 14 in which an evaluation result for the attention degree of the virtual objects is provided.

In particular, the virtual object may be any object in the virtual world that needs to be treated as a search target. For example, in embodiments, the virtual object may be a fixed object in the virtual world such as tree, building, or road, or may be a movable object such as a flying bird, car. etc. The virtual object may be part of an inherent scene in the virtual world, or it may comprise avatars or properties controlled by users. The virtual object may also be a particular area in the virtual world. Accordingly, obtaining geometrical information about the virtual objects at step 11 comprises: obtaining 3D geometrical parameters of various virtual objects in virtual world, the geometrical parameters including central position coordinates and shape parameters, etc.

Figure 2A:
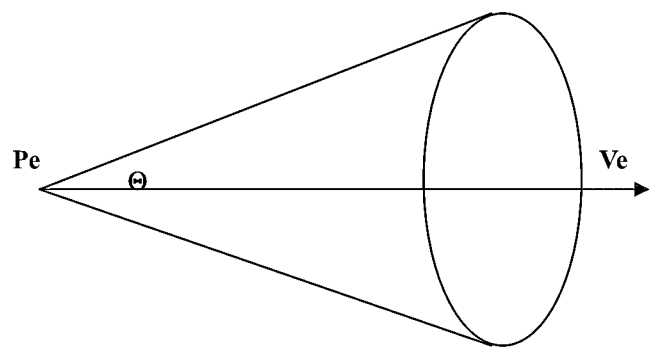
FIGS. 2A and 2B, shows a diagram of an avatar view field in a virtual world.
Figure 2B:
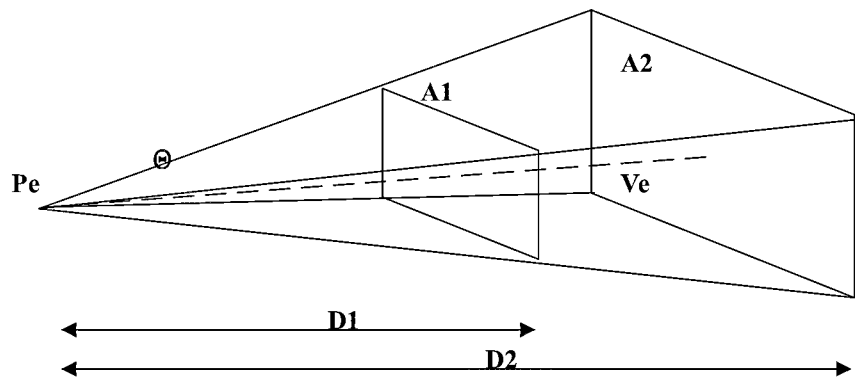

On the other hand, after entering the virtual world, each user performs activities in the virtual world as an avatar therein (in certain circumstance, it is also a special virtual object). A larger virtual world will also provide many different scenes, that is, different maps. In a certain scene, similar to the real world, an avatar has a certain view range, i.e., view field, and can see objects within this view range. FIG. 2 shows a diagram of an avatar view field in a virtual world. In some 3D virtual worlds, the view field is approximately a cone, as shown in FIG. 2A; the cone may be defined by vertex position Pe, an axis direction vector Ve, and a cone elevation angle Θ. More often, the view field is approximately a pyramid as shown in FIG. 2B, which is defined by a vertex position Pe, an axis direction vector Ve, an elevation angle Θ, and an aspect ratio of any clipping plane. In a more specific model, the actual view range of an avatar is a portion between near end clipping plane A1 and far end clipping plane A2 in the pyramid. Thus, characterization parameters of the view field may further comprise a nearest distance D1 and a farthest distance D2. Therefore, obtaining information about the avatar view field at step 11 comprises: obtaining parameters of view field of each avatar, such as a vertex position Pe, an axis direction vector Ve, an elevation angle Θ, an aspect ratio of clipping plane, etc.

It is appreciated that, by using space analytic geometry, the above geometrical information about the virtual objects and the avatar view fields can be readily denoted as 3D coordinates, vectors, angles, equations of curve or curved surfaces, and as point coordinates, curve equations, etc., in 2D space formed by projecting 3D space for subsequent calculation and use. Furthermore, the 3D geometrical information may be expressed in various ways such as by using a Cartesian coordinate system, polar coordinates system, etc. Usually, the provider of the virtual world has already stored and utilized such 3D geometrical information for purposes of calculation. Therefore, the process of obtaining the geometrical information generally only concerns retrieving the geometrical information.

After obtaining information related to the virtual objects and the avatar view fields, at step 12, the association between the avatar view fields and the virtual objects is determined; then at step 13, the attention degree of the virtual object is evaluated based on the association.

In particular, in an embodiment, determining the association between the avatar view fields and the virtual objects comprises: judging whether each virtual object falls in the view field of a particular avatar by comparing the position of the virtual object and the range of view field of the avatar. If a virtual object falls into the view field of a particular avatar, it is considered that this particular avatar "sees" the virtual object, or alternatively, the virtual object attracts attention from this particular avatar. Accordingly, a value of "attention degree" of that virtual object may be increased.

Figure 3:
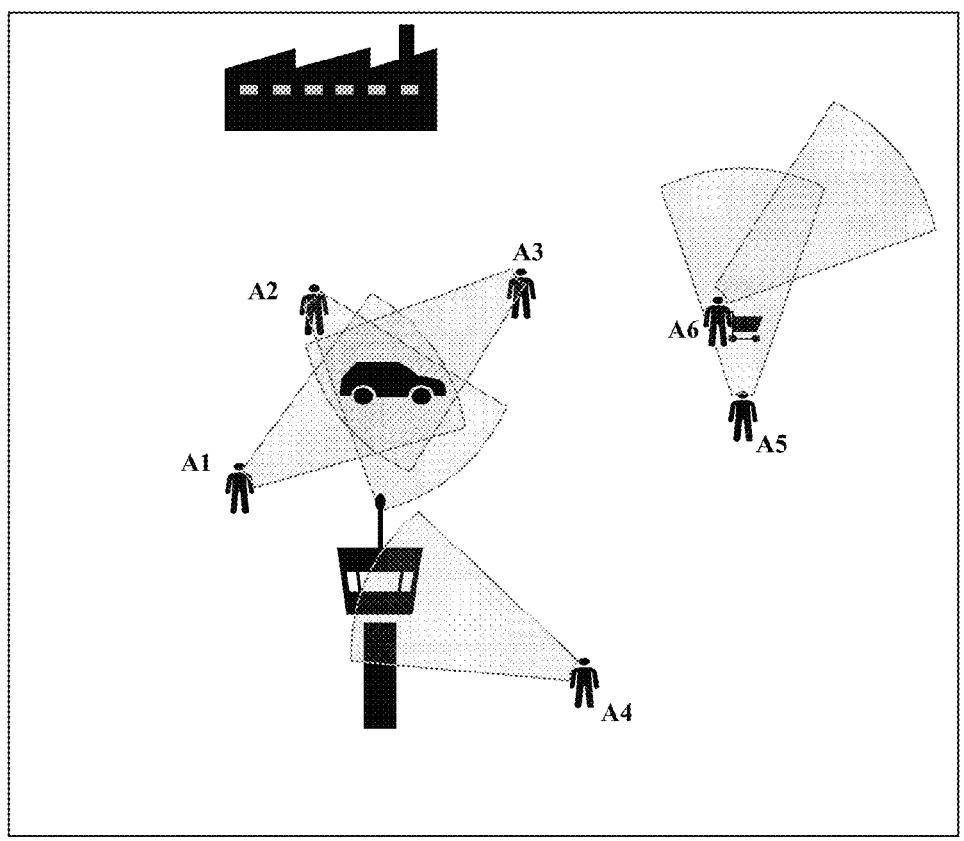
FIG. 3 shows an illustrative relationship between avatar view fields and virtual objects in a virtual scene.

FIG. 3 illustratively shows relationships between avatar view fields and virtual objects in a virtual scene. In FIG. 3, for simplicity and clearance, a projection plane diagram of a 3D scene in 2D is shown. The virtual scene illustratively comprises therein avatars A1-A6 and generic virtual objects represented by a car, building, lighthouse, etc. As mentioned above, for each avatar, a geometrical area may be defined by parameters such as a vertex position Pe, axis direction vector Ve, and elevation angle Θ of the view cone to represent view field range of the avatar. The shadow regions in FIG. 3 illustratively show each avatar's view field range defined in this way, which is projected in a 2D plane diagram as a sector region. By comparing the geometrical position of each virtual object to the view field region of each avatar in the scene one by one, it may be determined which virtual objects fall into the view field range of which avatars. It is appreciated that, on the basis of having obtained view field parameters of avatars and position parameters of virtual objects, the above comparison and determination can be readily performed through geometrical and mathematical operations. In FIG. 3, as a result of the comparison and determination, it can be seen that the car falls into the view field ranges of avatar A1, A2 and A3, the lighthouse falls into the view field range of avatar A4, and at the same time, the view field of avatar A5 covers avatar A6, while no object falls into the view field range of avatar A6. Based on the above association between virtual objects and respective avatar view fields, it can be considered that avatars A1-A3 currently are paying attention to the car located within their view field ranges, avatar A4 is paying attention to the lighthouse, and avatar A5 is paying attention to avatar A6. Thus, such association information and attention information may be used to score each virtual object to show its attention degree.

To evaluate the attention degree of a virtual object, in an embodiment, a counter is set for each virtual object in advance. A virtual object of interest is compared to the view field of each avatar successively; each time it is determined that the virtual object falls into the view field of an avatar, the counter for this virtual object is incremented by 1. Thus, the counter value of a virtual object can reflect that the virtual object falls into the view field of how many avatars, and thus, how many avatars are paying attention to the virtual object.

In particular, in the scene shown in FIG. 3, since the car falls into the view field ranges of three avatars A1, A2, A3 simultaneously, the score of the counter for the car is 3. Similarly, the score of the lighthouse is 1, the score of the avatar A6 is 1, and the score of other virtual objects is 0. Thus, each virtual object has obtained a score that can characterize its attention degree.

It is appreciated that in the above embodiment, a comparison is made between each virtual object of interest to the view field of each avatar so as to obtain an association between virtual objects and avatar view fields. To simplify computation for the above association, in an embodiment, the concept of area of interest (AOI) is further employed to accelerate the computation.

In such an embodiment, a scene of the virtual world is divided into a plurality of lattice cells, and each lattice cell is referred to as an area of interest. The area of interest itself may also be considered as a kind of virtual object. The size of an area of interest may be set based on actual needs. In a specific example, different AOI sizes may be set for different positions in a virtual world. For example, an AOI may be set smaller where there are many virtual objects and avatars; and an AOI may be set larger where there are fewer virtual objects and avatars. After dividing a virtual scene into AOIs, the virtual objects contained in each AOI are associated with that AOI. In a specific example, indexes or numbers are added to AOIs and a correspondence relationship between virtual objects and AOIs is recorded by using a corresponding table. The corresponding table is updated when the position of a virtual object changes. For ease of computation, some existing systems for providing a virtual world have employed the use of region division to provide and render a virtual scene. In this case, existing regional division and correspondence relationship may be selectively utilized.

Based on the above preliminary operation, the subsequent calculation of the association of virtual objects and avatar view fields will be simplified. In particular, at step 11 of FIG.

1, the step of obtaining geometrical information about the virtual objects further comprises: obtaining information of an AOI, such as position, number, and corresponding virtual objects contained therein, etc. This information may be obtained by reading the above corresponding table.

Next, at step 12, for each avatar, the AOI that overlaps with the avatar's view field is found and such AOI is considered as the AOI attracting attention from that avatar. Further, all virtual objects contained in the above AOI are considered as virtual objects to which that avatar pays attention. Accordingly, in step 13, the scores of attention degree of these virtual objects are increased. Thus, the attention degree of virtual objects may be simply determined.

Figure 4:
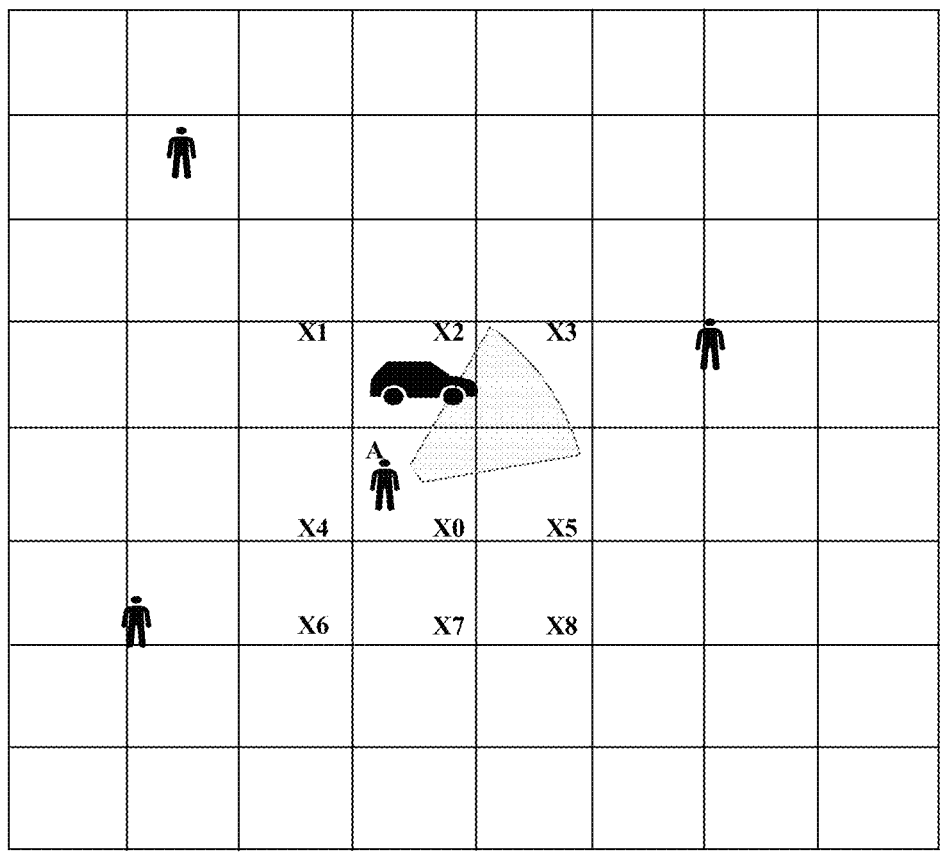
FIG. 4 shows a diagram of a virtual scene divided into areas of interest according to an embodiment of the invention.

FIG. 4 shows a diagram of a virtual scene divided into areas of interest according to an embodiment of the invention. Similar to FIG. 3, FIG. 4 also shows a projection of a 3D virtual scene in 2D. As shown in FIG. 4, a virtual scene is evenly divided into a plurality of AOIs. For example, if the dimension of the scene shown is 1024×1024, then each AOI may be set as 128×128. The process of determining an attention degree of a virtual object in conjunction with AOIs will be described, taking avatar A therein for example.

First, the AOI that is overlapped with the view field of avatar A is set as a target AOI. In one specific example, this step may be performed as follows: the AOI where avatar A resides is determined, and adjacent AOIs are determined by taking the AOI as the center and a certain length as a radius. The above radius is often selected in units of length of AOI, and the length of radius is related to the view field range of an avatar. In one example, the radius is set to be approximately equal to a height of an avatar's view cone, that is, the farthest distance that the avatar can "see". In other examples, the length of the above radius may be set as needed. In particular, in FIG. 4, avatar A resides in AOI X0. By taking X0 as the center and extending toward each direction with a radius of one AOI, 9 adjacent AOIs X0-X8 that surrounding X0 (e.g., containing X0) are obtained (since FIG. 4 is a 2D projection, in a real 3D scene, 27 adjacent AOIs should be obtained; however, for ease of description, the following description will still be made with reference to the number in a 2D diagram). These 9 adjacent AOIs are considered as areas that may be seen by avatar A. For these 9 possible areas, each of the AOIs is compared with the view field range of avatar A to determine whether it overlaps with the view field of the avatar. Since the vertex of the cone is located in AOI X0, X0 will necessarily overlap with the view field, so, it actually only needs to compare the remaining 8 AOIs to the view field range. In one specific example, an AOI will be considered as a target AOI as long as it overlaps with the view field of avatar A; in another example, a threshold proportion (such as 20% or 50%) may be set and an AOI whose view field overlap exceeds that threshold will be considered as a target AOI. In the example of FIG. 4, 4 AOIs X0, X2, X3, X5 that overlap with the view field of avatar A will all be considered as target AOIs.

After obtaining a set of target AOIs, the virtual objects contained in each target AOI are obtained based on a correspondence relationship between the AOIs and the virtual objects, and these virtual objects are considered as objects that avatar A is currently paying attention to. Accordingly, the counters of these virtual objects are increased by 1. In an embodiment, as a special virtual object, a counter is also set for the AOI itself. After determining that the AOI is a target AOI of avatar A, the counter of that AOI is also increased by 1.

It can be seen that, in the implementation shown in FIG. 4, a limited number of adjacent AOIs are compared with the view field range of an avatar. In comparison to embodiments in which a large number of virtual objects are directly compared with avatar view fields, this manner of AOI division has a significantly reduced computation load. However, since this manner of AOI division makes a comparison to an avatar view field on an AOI level, it may not accurately ensure that every virtual object in a target AOI will fall into an avatar view field.

In the above embodiments, for each virtual object falling into the view field range of an avatar, the virtual object's counter is incremented by 1 to indicate a rise in attention degree. In a further embodiment, the score of a virtual object can be further refined to more accurately reflect the degree of attention on the virtual object.

In an embodiment, the step of determining the association between the avatar view field and the virtual object in step 12 further comprises: for each virtual object falling into the view field range of a particular avatar, determining the relative position of the virtual object in the view field range of the particular avatar. Accordingly, at step 13, the score of attention degree of a virtual object is calculated by taking the above relative position as weight.

Figure 5:
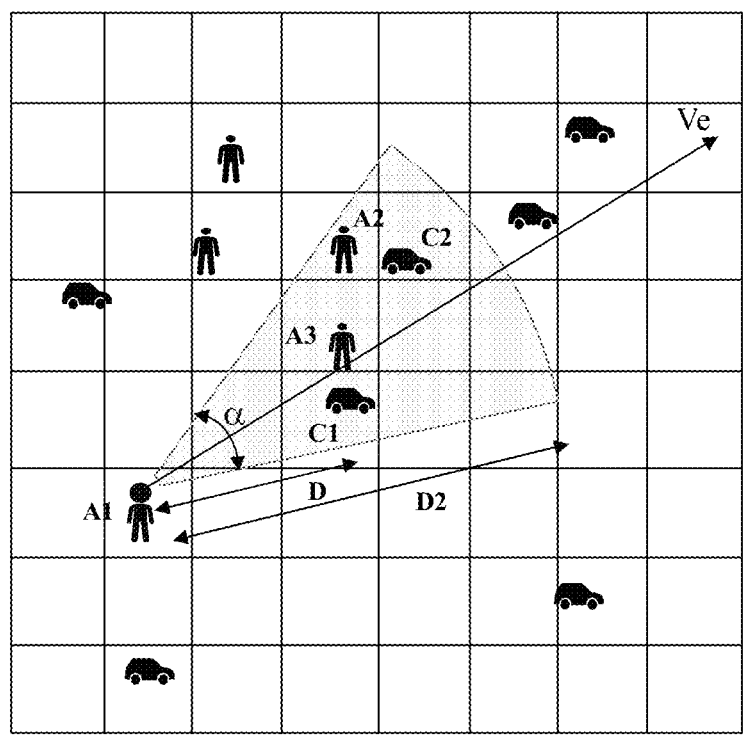
FIG. 5 shows an illustrative relationship between an avatar view field and virtual objects in a virtual scene.

FIG. 5 illustratively shows a relationship between avatar view field and virtual objects in a virtual scene. As shown in FIG. 5, it is determined that two avatars A2, A3 and two cars C1, C2 fall into the view field range of avatar A1. It is assumed that the view field of A1 employs the pyramid shown in FIG. 2B, which has vertex position Pe, axis direction vector Ve, elevation angle Θ, and farthest distance D2. To determine the relative position of a virtual object in the view field, in an embodiment, the relative distance and relative angle of the virtual object are determined. For example, for car C1 in FIG. 5, its distance D to cone vertex Pe of avatar A, and angle α between the line connecting C1 and Pe and cone axis direction Ve are determined, and the relative distance D and relative angle α are taken as parameters to characterize the relative position of car C1. D/D2 and α/Θ may also be taken as parameters to characterize the relative position of car C1.

Based on the relative position of virtual objects in avatar view fields, the score of attention degree of a virtual object may be refined. In an embodiment, the score S of attention degree of a virtual object is set as:

$$S = a\frac{D2}{D} + b\frac{\Theta - \alpha}{\Theta}$$

wherein, a and b are settable positive parameters. The first item in the above formula reflects the influence of the relative distance D: the smaller the relative distance D is, the higher the score S is; the second item reflects the influence of the relative angle α: the smaller the relative angle α is, the higher the score S is. It is appreciated that a person skilled in the art can construct various other algorithms, thereby introducing the influence of relative distance and/or relative angle in score S of attention degree of virtual objects.

In an embodiment, in addition to considering the relative position of a virtual object in the avatar view field, a time factor during which a virtual object falls into the avatar view field is also taking into account. That is, the step of determining the association between the avatar view field and the virtual object in step 12 further comprises: determining a duration in which the virtual object is associated with the avatar view field. In particular, in an embodiment, for a virtual object that is determined to be within the view field range of a particular avatar, a timer is set for it for determining the duration time in which the virtual object falls into the view field range, that is, the time in which the virtual object is receiving getting attention from the avatar. Furthermore, in the process of calculating the attention degree of the virtual object, the factor of the above duration time is introduced, such that score of attention degree will be correspondingly higher for a virtual object to which attention is paid for a relatively long time.

Figure 6:
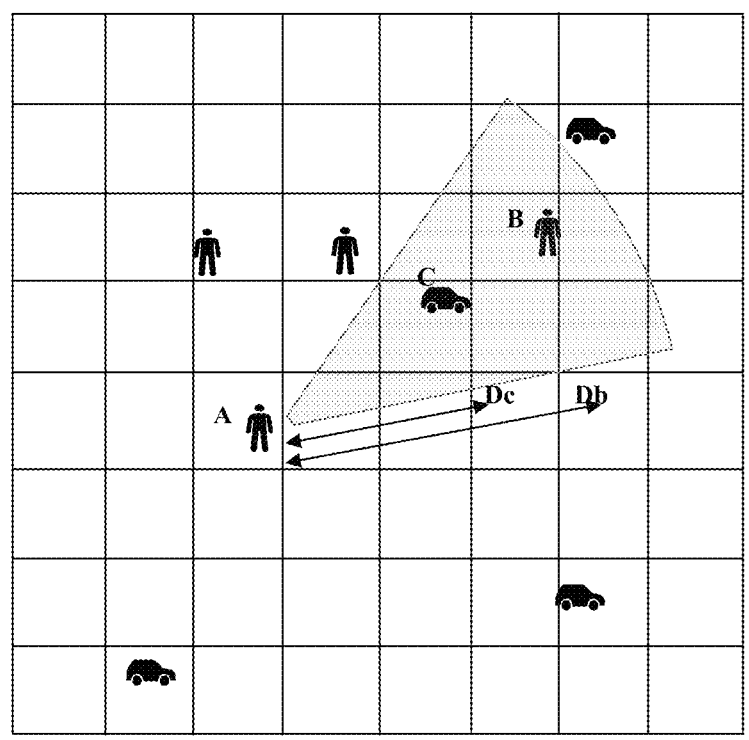
FIG. 6 shows an illustrative relationship between multiple virtual objects in a virtual scene.

In an embodiment, for a plurality of virtual objects falling into a view field range of an avatar, the relative position between these virtual objects is further considered, so as to determine whether there is shading between these virtual objects. FIG. 6 illustratively shows a relationship between multiple virtual objects in a virtual scene. In FIG. 6, car C and avatar B simultaneously fall into the view field range of avatar A, in which car C's distance to avatar A is Dc, and avatar B's distance to avatar A is Db, Dc<Db. Here, the characteristic size of car C that is closer to avatar A is considered, and an enveloping box is formed around car C based on that characteristic size to envelop car C in that box. It is appreciated that the characteristic size of the virtual object may be based on existing parameters, or may be based on parameters derived from generic shape parameters of the virtual object. There may also be various kinds of enveloping boxes, as long as an enveloping box can approximately form envelope surfaces surrounding the virtual object. On this basis, it is determined whether a line connecting a relatively farther virtual object (i.e., avatar B) and avatar A passes through the enveloping box of car C. If it does, then it is considered that, from the perspective of avatar A, avatar B is shaded by car C; otherwise, it is considered that avatar B has not been shaded.

In addition to the illustrative method shown in FIG. 6, there are various other algorithms in the art for determining whether shading exists in 3D space. It is appreciated that, in embodiments of the invention, an appropriate algorithm may be selected based on required computation accuracy and computation capability. In some embodiments, besides the judgment on whether there is shading between virtual objects, the process may also determine the shading degree or proportion of virtual objects. Accordingly, in the process of calculating the score of attention degree for virtual objects, the shading factor of virtual objects is introduced into the score as a weight, such that in comparison to virtual objects that have not been shaded, the score of attention degree of shaded virtual object will be lower. Further, in the case that a shading proportion can be determined, the virtual object with higher shading proportion will have a lower score of attention degree.

Although in the above embodiments, multiple factors of association between virtual objects and avatar view fields are considered, it is appreciated that other factors or detailed factors may further be introduced as needed, such as the duration in which an avatar is dreaming away, the proportion occupied in an avatar view field by a virtual object, etc. Furthermore, in different embodiments, the above listed factors and other factors that will occur to a person skilled in the art may be considered separately or in combination, so as to obtain information about attention degree of virtual objects.

After assigning a score characterizing the attention degree for an virtual object of interest, in step 14 of FIG. 1, embodiments of the invention provide evaluation on the attention degree of the virtual object.

In an embodiment, in response to a user's search request, the attention degree of virtual objects related to the search request are ranked and a ranked search result is provided. A user's search request may be directed to a particular virtual object, such as requesting to search for the hottest car at the present time. In this case, the method of the present embodiment ranks the scores of all virtual objects that comprise a car and provides cars with relatively high scores of attention degree in accordance with that ranking. In another example, a user's search request may be directed to an area, such as requesting to search the hottest area at the present time. In this case, AOIs are taken as virtual objects, scores of respective AOI are ranked, and areas with higher score of attention degree are provided according to the ranking. A user may also search his own or other avatar's attention degree, that is, request to query the rank of attention degree of a particular avatar. Here, scores of attention degree of all avatars may be ordered, so as to give a rank status of the particular avatar requested by the user.

In an embodiment, the evaluation result related to attention degree may be provided actively. In particular, the evaluation result may be actively presented to a portion of or all users in form of real time statistic information or a top list, and be updated at predefined time interval. In some examples, the evaluation result may also be provided in the form of a hot item recommendation, so as to provide an existing virtual world with the additional feature of hot recommendations.

To provide the above attention degree related evaluation result, in an embodiment, the attention degree of various virtual objects may be continuously analyzed and scored in real time, and the scores are ranked as needed to provide an evaluation result. In another embodiment, the scoring and ranking of a particular virtual object is initiated in response to a user's search request. That is, on receipt of a search request from a user, analyzing and scoring of attentive degree will be performed on virtual objects related to the user's search request, and then the search result will be provided. It is appreciated that, in various embodiments, the timing to initiate each step may be set based on actual needs, so as to more advantageously provide user with evaluation result that is more pertinent.

Figure 7:
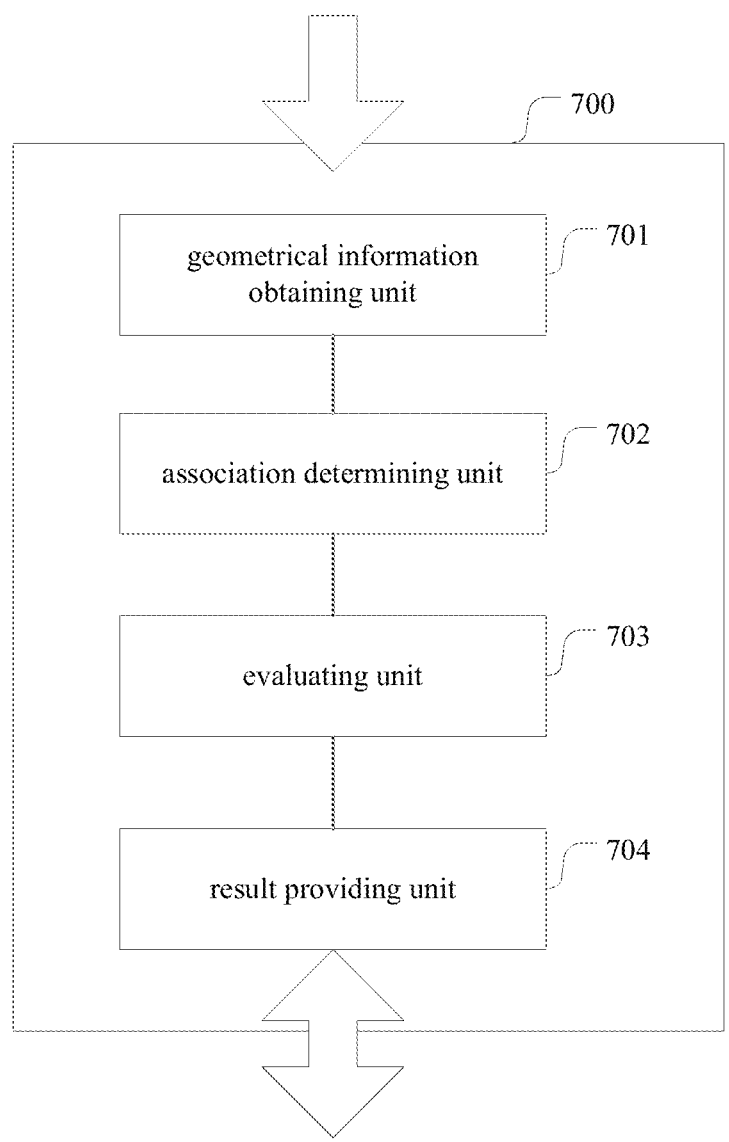
FIG. 7 is a block diagram of an apparatus for performing a search in virtual world according to an embodiments.

Under the same inventive conception, the present invention also provides an apparatus for performing a search in a 3D virtual world. FIG. 7 is a block diagram of an apparatus for performing a search in a virtual world according to an embodiment of the invention. The 3D world comprises a plurality of virtual objects and avatars controlled by users, wherein the avatars have corresponding avatar view fields. As shown in FIG. 7, the apparatus 700 comprises: a geometrical information obtaining unit 701 configured to obtain geometrical information about the virtual objects and geometrical information about the avatar view fields; an association determining unit 702 configured to determine the association between the avatar view fields and the virtual objects based on the above geometrical information; an evaluating unit 703 configured to evaluate the attention degree of the virtual objects based on the association; and a result providing unit 704 configured to provide an evaluation result for the attention degree of the virtual objects.

In particular, the geometrical information obtaining unit 701 may be configured to obtain 3D geometrical parameters of various virtual objects of interest in a virtual world, the geometrical parameters including central position coordinates, shape parameters, etc. Further, the unit 701 may also be configured to obtain parameters of view field of each avatar, such as vertex position Pe, axis direction vector Ve, elevation angle $\Theta$, and aspect ratio of clipping plane, etc.

Based on the obtained geometrical information related to virtual objects and avatar view field, the association determining unit 702 may be configured to judge whether each virtual object falls into a view field range of a particular avatar by comparing the position of the virtual object with the view field range of the avatar. Accordingly, the evaluating unit 703 is configured to increase, for a virtual object fallen into view field range of a particular avatar, the score of attention degree of that virtual object. In particular, in an embodiment, a counter is set for each virtual object in advance. The association determining unit 702 compares a certain virtual object of interest with the view field range of each avatar successively and passes the comparison result to the evaluating unit 703; each time it is determined by the association determining unit 702 that the virtual object falls into the view field of an avatar, the evaluating unit 703 increments the counter for this virtual object by 1. Thus, counter value of a virtual object can reflect that how many avatars are paying attention to that virtual object.

To simplify the above calculation, in an embodiment, the scene of the virtual world is divided into a plurality of lattice cells (i.e., area of interest, AOI) in advance and virtual objects contained in each area of interest are corresponded to that area of interest. Optionally, such an operation may be accomplished by an additional region management unit. Based on this, the geometrical information obtaining unit 701 is further configured to obtain information of area of interest, such as position, index, corresponding virtual objects contained therein, etc. Accordingly, the association determining unit 702 is configured to find, for each avatar, the area of interest overlapped with its view field as a target area of interest; the evaluating unit 703 is configured to increase counters of virtual objects contained in the target area of interest.

In particular, the association determining unit 702 may determine the area of interest where a particular avatar is located, and determine adjacent AOIs by taking that AOI as the center and a certain length as a radius. Then, for adjacent AOIs, the unit 702 compares each of the AOIs with view field range of the particular avatar to judge whether it is overlapped with the view field, and take each AOI that is overlapped with the view field as a target AOI. Thereafter, virtual objects contained in each target AOI are obtained based on the correspondence relationship between AOI and virtual objects. Accordingly, the evaluating unit 703 increments counters of these virtual objects by 1. In an embodiment, the evaluating unit 703 also increments the counter of the target AOI by 1.

To further refine score of virtual object, in an embodiment, the association determining unit 702 is further configured to, for a virtual object falling into view field range of a particular avatar, determine the relative position of that virtual object within view field range of that particular avatar. Accordingly, the evaluating unit 703 is configured to calculate a score of attention degree of the virtual object by taking the relative position as a weight. In particular, in an embodiment, the association determining unit 702 determines the relative distance and relative angle of a virtual object falling into a particular view field. The evaluating unit 703 introduces an influence of the relative distance and/or relative angle into the score of attention degree of the virtual object.

In an embodiment, the association determining unit 702 is further configured to determine the duration in which a virtual object is associated with a particular avatar view field. Accordingly, the evaluating unit 703 introduces the factor of association duration into the calculation of the score of attention degree for the virtual object, such that the score of attention degree will be correspondingly higher for the virtual object to which attention is paid for a relatively long time.

In an embodiment, the association determining unit 702 is further configured to, for a plurality of virtual objects falling into a view field range of an avatar, consider the relative position between these virtual objects, so as to determine whether there is shading between the virtual objects and the proportion of shading, if any. Accordingly, the evaluating unit 703 is configured to introduce a shading factor of virtual objects into the score of attention degree as a weight during the process of calculating the score of attention degree for virtual objects.

It is appreciated that, in different embodiments, the association determining unit 702 may consider the above listed association factors and other factors that will occur to a person skilled in the art separately or in combination, and the evaluating unit 703 will assign a score characterizing the attention degree to a virtual object based on such association information.

The result providing unit 704 is configured to provide an evaluation result of attention degree of the virtual objects based on the score of attention degree assigned to virtual objects by the evaluating unit 703. In an embodiment, in response to a user's search request directed to a particular kind of virtual object, to a particular avatar, or to a particular region, the result providing unit 704 provides an evaluation result correspondingly related to attention degree. In an embodiment, the result providing unit 704 may also actively provide an evaluation result related to attention degree.

The above described search apparatus 700 may be located at a server side or a client side of a virtual world providing system. Alternatively, part of units of the apparatus may be located at a client side with other part of units at a server side. For example, in one embodiment, the geometrical information obtaining unit may be disposed at a client side for collecting various kinds of information related to avatars, and the association determining unit and the evaluating unit may be disposed at a server side for analyzing the collected information globally, so as to calculate scores of attention degree for virtual objects, and the result providing unit is disposed at a client side to facilitate the reception of a user request and the presentation of search result. The arrangement of each unit may be adjusted and modified by those skilled in the art based on calculation needs.

Those skilled in the art can appreciated that, the above method and apparatus for evaluating attention degree in a 3D virtual world may be implemented by computer executable instructions and/or control codes contained in or executed by a processor and/or a computer system, and such codes may be provided on a carrier medium such as a magnetic disk, CD or DVD-ROM, programmable memory such as read only memory (firmware), or a data carrier such as an optical or electrical signal bearer. The apparatus of the present invention and units thereof may be implemented by a hardware circuit such as a large scale integrated circuit or gate arrays, semiconductors such as logic chip or transistors, or programmable hardware devices such as field programmable gate array, programmable logic device, or can be implemented with software executed by various types of processors, or can be implemented by a combination of the above hardware circuit and software. Software and program code for carrying out operations of the present invention may be written in any combination of one or more programming languages, including but not limited to, an object oriented programming language such as Java, Smalltalk, C++ or the like and conventional procedural programming languages, such as the C programming language or similar programming languages. The program code may be executed locally or remotely on the computer so as to accomplish the intended operation.

Although a method and apparatus of the present invention for evaluating attention degree have been described in conjunction with detailed embodiments, the present invention is not limited thereto. Those skilled in the art can make various changes, substitutions and modifications in light of the teachings of the description without departing from the spirit and scope of the invention. It should be appreciated that, all such changes, substitutions and modifications still fall into protection scope of the invention which is defined by appended claims.

The invention claimed is:

1. A method for evaluating attention degree in a three-dimensional (3D) virtual world, the 3D virtual world comprising at least one virtual object and at least one avatar controlled by a user, the at least one avatar having a corresponding avatar view field, the method comprising:

dividing a scene in the 3D virtual world into a plurality of lattice cells each designating an area of interest, each area of interest having a size dependent upon a number of virtual objects and avatars therein, wherein areas of interest having a larger number of virtual objects and avatars have a larger size in comparison to areas of interest having a smaller number of virtual objects and avatars;

determining an association of virtual objects that are contained in each area of interest;

applying an index to each area of interest;

recording the association between the virtual objects in each of the areas of interest in a correspondence table per the indexes, the correspondence table containing a correspondence relationship between each area of interest and the virtual objects contained therein, information in the correspondence table is updated as positions of the virtual objects change within the areas of interest;

obtaining geometrical information about the avatar view field and geometrical information about the at least one virtual object, wherein the obtaining of geometrical information about the at least one virtual object includes receiving a position and number of virtual objects in each area of interest from the correspondence table, the avatar view field represented by a pyramid having a vertex position Pe, an axis direction vector Ve extending from the vertex position Pe, an elevation angle $\Theta$ formed between lines in the pyramid that intersect at the vertex position Pe, and a distance D2 measured from the vertex position Pe that is indicative of a farthest distance point of the avatar view field, the at least one object represented by a distance D from the vertex position Pe, and an angle $\alpha$ formed between a line connecting the at least one object and the vertex position Pe and the axis direction vector Ve;

determining an association between the avatar view field and the at least one virtual object based on the geometrical information, wherein the determining of an association between the avatar view field and the at least one virtual object based on the geometrical information includes determining a relative position of the at least one virtual object with respect to the avatar view field, wherein the relative position is determined as a function of D/D2 and $\alpha/\Theta$;

evaluating an attention degree of the at least one virtual object based on the association, wherein the attention degree is based on the relative position of the at least one virtual object with respect to the avatar view field; and providing an evaluation result for the attention degree of the at least one virtual object, wherein the evaluation result comprises a score indicative of the attention degree of the at least one virtual object, the score of attention degree defined as:

$$S = a\, D2/D + b\Theta - \alpha/\Theta, \text{ wherein}$$

a and b are settable positive parameters,

D2/D reflects an influence of the relative distance D such that a smaller relative distance D results in a higher score S, and $\Theta - \alpha/\Theta$ reflects an influence of the relative angle $\alpha$ such that a smaller relative angle $\alpha$ results in a higher score S.

2. The method of claim 1, wherein obtaining geometrical information about the at least one virtual object further comprises: obtaining geometrical parameters of the at least one virtual object in the virtual world, the geometrical parameters including central position coordinates and shape parameters of the at least one virtual object.

3. The method of claim 1, wherein determining the association between the avatar view field and the at least one virtual object further comprises: judging whether the at least one virtual object falls within the view field of a particular avatar; and wherein evaluating the attention degree of the at least one virtual object further comprises: setting a counter for the at least one virtual object, wherein a value of the counter reflects a number of the avatars whose view fields include the at least one virtual object.

4. The method of claim 1, wherein determining the association between the avatar view field and the at least one virtual object further comprises: for each avatar in the 3D virtual world, determining the area of interest that overlaps with the avatar view field as a target area of interest, all virtual objects in the target area of interest are designated as drawing the attention from the avatar; and wherein evaluating the attention degree of the at least one virtual object further comprises: increasing scores of attention degree of all the virtual objects corresponding to the target area of interest.

5. The method of claim 4, wherein determining the area of interest that overlaps the avatar view field further comprises: determining the area of interest in which the avatar is located; determining at least one area of interest adjacent to the area of interest in which the avatar is located by taking the area of interest in which the avatar is located as a center and moving a certain length as a radius in all directions extending from the center, each adjacent area of interest is representative of areas in the 3D virtual world that may be viewable by the avatar; and successively judging whether each adjacent area of interest overlaps the avatar view field, wherein each adjacent area of interest is compared to a view of field range of the avatar to determine whether there is an overlap.

6. The method of claim 1, wherein evaluating the attention degree of the at least one virtual object further comprises: weighting the score of the attention degree of at least one virtual object based on the relative position.

7. The method of claim 1, wherein determining the association between the avatar view field and the at least one virtual object further comprises: for a plurality of virtual objects falling into a range of the same avatar view field, determining a shading relationship between the plurality of virtual objects; and wherein evaluating the attention degree of the at least one virtual object further comprises: weighting the score of the attention degree of the at least one virtual object based on the shading relationship.

8. The method of claim 1, wherein determining the association between the avatar view field and the at least one virtual object comprises: determining a duration time in which the at least one virtual object falls into a range of a particular avatar view field; and wherein evaluating an attention degree of the at least one virtual object further comprises: weighting the score of the attention degree of at least one virtual object based on the duration time.

9. The method of claim 1, wherein providing the evaluation result for the attention degree of the at least one virtual object further comprises: in response to a user's search request, ranking the attention degree of the virtual objects associated with the search request and providing the ranked search result related to the attention degree.

10. A computer system for evaluating attention degree in a three-dimensional (3D) virtual world, the 3D virtual world comprising at least one virtual object and at least one avatar controlled by user, the at least one avatar having a corresponding avatar view field, the computer system comprising:

at least one processing unit;

memory operably associated with the at least one processing unit; and a module storable in memory and executable by the at least one processing unit, the module comprising:

a region management unit configured to divide a scene in the 3D virtual world into a plurality of lattice cells each designating an area of interest, each area of interest having a size dependent upon a number of virtual objects and avatars therein, wherein areas of interest having a larger number of virtual objects and avatars have a larger size in comparison to areas of interest having a smaller number of virtual objects and avatars, the region management unit further configured to determine an association of virtual objects that are contained in each area of interest; apply an index to each area of interest; and record the association between the virtual objects in each of the areas of interest in a correspondence table per the indexes, the correspondence table containing a correspondence relationship between each area of interest and the virtual objects contained therein, information in the correspondence table is updated as positions of the virtual objects change within the areas of interest;

a geometrical information obtaining unit configured to obtain geometrical information about the avatar view field and geometrical information about the at least one virtual object, wherein the obtaining of geometrical information about the at least one virtual object includes receiving a position and number of virtual objects in each area of interest from the correspondence table, the avatar view field represented by a pyramid having a vertex position Pe, an axis direction vector Ve extending from the vertex position Pe, an elevation angle $\Theta$ formed between lines in the pyramid that intersect at the vertex position Pe, and a distance D2 measured from the vertex position Pe that is indicative of a farthest distance point of the avatar view field, the at least one object represented by a distance D from the vertex position Pe, and an angle $\alpha$ formed between a line connecting the at least one object and the vertex position Pe and the axis direction vector Ve;

an association determining unit configured to determine an association between the avatar view field and the at least one virtual object based on the geometrical information, wherein the determining of an association between the avatar view field and the at least one virtual object based on the geometrical information includes determining a relative position of the at least one virtual object with respect to the avatar view field, wherein the relative position is determined as a function of D/D2 and $\alpha/\Theta$;

an evaluating unit configured to evaluate an attention degree of the at least one virtual object based on the association, wherein the attention degree is based on the relative position of the at least one virtual object with respect to the avatar view field; and a result providing unit configured to provide an evaluation result for the attention degree of the at least one virtual object, wherein the evaluation result comprises a score indicative of the attention degree of the at least one virtual object, the score of attention degree defined as:

$S=a(D2/D)+b((\Theta-\alpha)/\Theta)$, wherein a and b are settable positive parameters, D2/D reflects an influence of the relative distance D such that a smaller relative distance D results in a higher score S, and $(\Theta-\alpha)/\Theta$ reflects an influence of the relative angle $\alpha$ such that a smaller relative angle $\alpha$ results in a higher score S.

11. The computer system of claim 10, wherein the geometrical information obtaining unit is configured to obtain geometrical parameters of the at least one virtual object in the virtual world, the geometrical parameters including central position coordinates and shape parameters of the at least one virtual object.

12. The computer system of claim 10, wherein the association determining unit is configured to judge whether the at least one virtual object falls into a view field of a particular avatar; and wherein the evaluating unit is configured to set a counter for the at least one virtual object, wherein a value of the counter reflects a number of avatars whose view fields include the at least one virtual object.

13. The computer system of claim 10, wherein the association determining unit is configured to: for each avatar in the 3D virtual world, determine the area of interest that overlaps with the avatar view field as a target area of interest, all virtual objects in the target area of interest are designated as drawing the attention from the avatar; and wherein the evaluating unit is configured to increase scores of attention degree of all the virtual objects corresponding to the target area of interest.

14. The computer system of claim 13, wherein the association determining unit is further configured to: determine the area of interest where the avatar is located; determine at least one area of interest adjacent to the area of interest in which the avatar is located by taking the area of interest where the avatar is located as a center and moving a certain length as a radius in all directions extending from the center, each adjacent area of interest is representative of areas in the 3D virtual world that may be viewable by the avatar; and successively judge whether each adjacent area of interest overlaps the avatar view field, wherein each adjacent area of interest is compared to a view of field range of the avatar to determine whether there is an overlap.

15. The computer system of claim 10, wherein the evaluating unit is configured to weight the score of the attention degree of at least one virtual object based on the relative position.

16. The computer system of claim 10, wherein the association determining unit is further configured to, for a plurality of virtual objects falling within a range of the same avatar view field, determine a shading relationship between the plurality of virtual objects; and wherein the evaluating unit is configured to weight the score of the attention degree of at least one virtual object based on the shading relationship.

17. The computer system of claim 10, wherein the association determining unit is further configured to determine a duration time in which the at least one virtual object falls into a range of a particular avatar view field; and wherein the evaluating unit is configured to weight the score of the attention degree of at least one virtual object based on the duration time.

18. The computer system of claim 10, wherein the result providing unit is configured to, in response to a user's search request, rank the attention degree of virtual objects associated with the search request and provide a ranked search result related to the attention degree.

* * * * *